April 6, 1971 D. W. McKEE ET AL 3,573,988
ELECTRODE COMPRISING NON-NOBLE METAL DISULFIDES OR
PHOSPHIDES AND ELECTROCHEMICAL CELL UTILIZING SAME
Filed Dec. 23, 1968
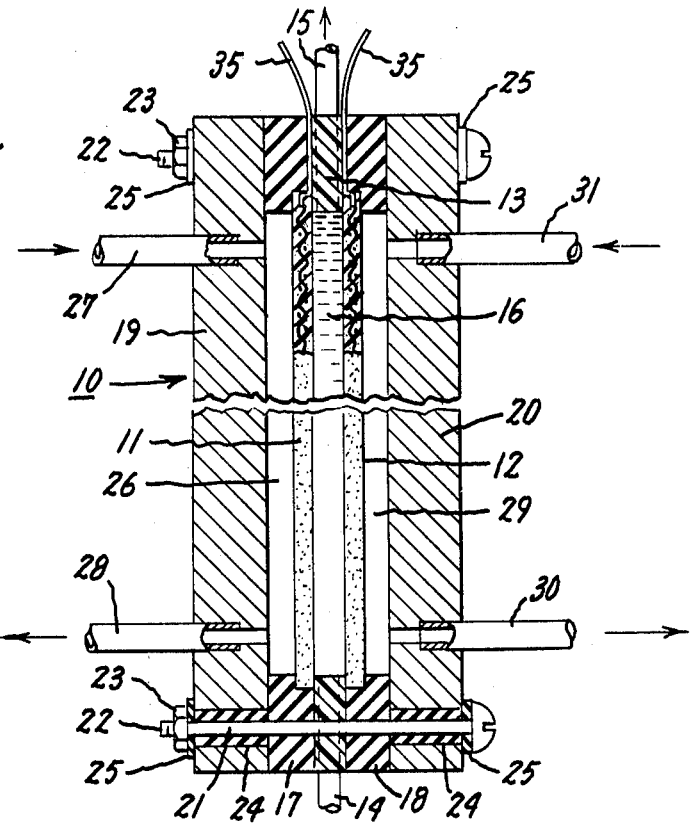
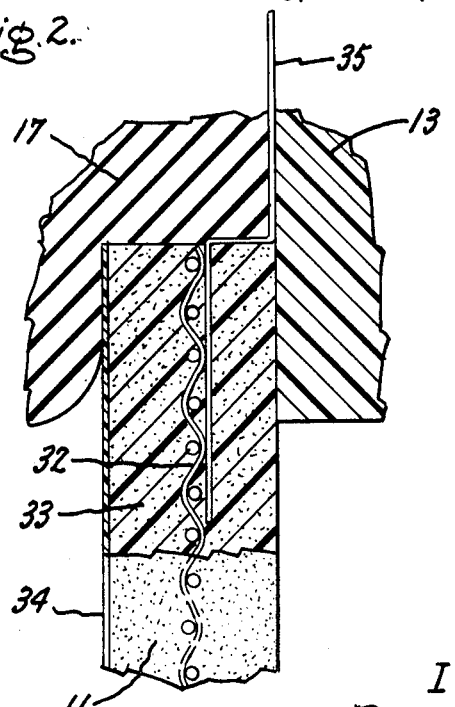
Inventors:
Douglas W. McKee,
Mun S. Pak,
by Paul R. Webb, II
Their Attorney.

United States Patent Office 3,573,988
Patented Apr. 6, 1971

3,573,988
ELECTRODE COMPRISING NON-NOBLE METAL DISULFIDES OR PHOSPHIDES AND ELECTRO-CHEMICAL CELL UTILIZING SAME
Douglas W. McKee, Burnt Hills, and Mun S. Pak, Stormville, N.Y., assignors to General Electric Company
Filed Dec. 23, 1968, Ser. No. 786,268
Int. Cl. H01m 13/00, 27/00
U.S. Cl. 136—86                           5 Claims

ABSTRACT OF THE DISCLOSURE

An electrode is composed of particles of a metallic disulfide, a metallic phosphide, or such particles coated with a non-noble metal bonded together with a binder, and an electrical lead in electrical contact with the bonded particles. The metallic component of the disulfide or the phosphide is selected from the class consisting of molybdenum, tungsten, zirconium, niobium, hafnium, and tantalum. This electrode, which does not contain any noble metal catalyst, is particularly useful in electrochemical cells employing alkaline electrolytes.

---

This invention relates to electrodes and to electrochemical cells and, more particularly, to electrodes comprising particles of a metallic disulfide, a metallic phosphide, or such particles coated with a non-noble metal bonded together with a binder wherein no noble metal catalyst is employed, and to electrochemical cells which employ such electrodes as cathodes with alkaline electrolytes.

As it is well known, electrochemical cells are devices capable of generating electricity by electrochemically combining an oxidizable reactant, termed a fuel, and a reducible reactant, termed an oxidant. Such electrochemical cells include fuel cells, metal-air cells, and metal-fuel cells. The reactants are fluids, either liquids or gases, and usually fed continuously to the cell. The cell is comprised of spaced electrodes ionically connected by an electrolyte. Each electrode is electronically conductive, adsorbs the fuel or oxidant employed, presents catalyst materials for the electrode reaction, and does not oxidize unduly under the operating conditions of the cell. When fuel and oxidant are concurrently and separately supplied to the different electrodes of a cell, an electrical potential will develop across the electrodes. When an electrical load is provided across the electrodes, an electrical current flows therebetween.

A metal-air cell is a galvanic cell which uses an oxidant of pure oxygen or oxygen from the air as the reactive material consumed at the positive electrode. The oxygen thereby serves as a cathode depolarizer. Various types of gas diffusion cathodes through which oxygen can be diffused can be employed. These include, for example, carbon electrodes, pasted electrodes of a metal catalyst bonded by polytetrafluoroethylene on a metal screen, and catalytically active carbon particles bonded together and to a grid by a hydrophobic binder. The anode in such a cell is produced from various materials, such as magnesium, lead, zinc and aluminum. A rechargeable cell can be provided when lead, zinc, iron or cadmium is used as the anode. An aqueous electrolyte is in contact with both electrodes which are spaced apart. In the operation of the cell, the lead dioxide, for example, is reduced to lead. Such a cell can also be recharged.

A fuel cell comprises generally a pair of electrodes separated by an electrolyte. A fuel, such as hydrogen, is supplied to the anode electrode where it reacts and releases electrons. These electrons flow through an external circuit connection to the cathode or positive electrode and there are consumed by air or pure oxygen gas. The electrical circuit is completed through the fuel cell by ionic conduction through the electrolyte. In a fuel cell battery, which consists frequently of a plurality of individual cells, it is necessary to provide a complex system of channels to supply both the hydrogen and oxygen gases to the respective electrodes.

Our present invention is directed to an improved electrode which operates effectively as a cathode in an alkaline electrolyte electrochemical cell. The electrode, which contains no noble metal catalyst, is resistant to electrolyte corrosion.

It is a primary object of our invention to provide a new and improved inexpensive, high surface area electrode.

It is another object of our invention to provide such an electrode which resists attack by alkaline electrolyte.

It is a further object of our invention to provide an electrochemical cell which includes such an electrode as its cathode.

In accordance with one aspect of our invention, an electrode comprises particles selected from the class consisting of metallic disulfides and metallic phosphides, a binder material holding the particles together in a coherent, unitary, gas permeable, electronically conductive mass, and an electrical lead in electrical contact with the bonded particles.

These and various other objects, features and advantages of the invention will be better understood from the following description taken in connection with the accompanying drawing in which:

FIG. 1 is a sectional view of an electrochemical cell in the form of a fuel cell made in accordance with our invention;

FIG. 2 is an enlarged sectional view of an electrode made in accordance with our invention.

In FIG. 1 of the drawing, there is shown generally at 10 an electrochemical cell in the form of a fuel cell embodying our invention which comprises cathode 11 and an anode 12, separated by an annular electroylte gasket 13. Electrolyte inlet conduit 14 and electrolyte outlet conduit 15 are sealingly related to the electrolyte gasket to circulate a free aqueous alkaline electrolyte to and from electrolyte chamber 16 formed by the cathode, anode, and gasket. A cathode gasket 17 and an anode gasket 18 are positioned adjacent opposite faces of the electrolyte gasket to seal therewith and to hold the cathode and anode in assembled relation. Identical end plates 19 and 20 are associated with the cathode and anode gaskets, respectively, in sealing relation therewith. To hold the gaskets and end plates in assembled relation, a plurality of tie bolts 21 are provided, each having a threaded end 22 and a nut 23 mounted thereon. While electrically insulating end plates of polytetrafluoroethylene are preferred, electrically conductive end plates may be used. In the latter event to insure against any possibility of internal short circuiting of the fuel cell electrodes, the tie bolts are provided with insulative bushings 24 within each end plate and with an insulative washer 25 adjacent each terminus.

An oxidant chamber 26 is formed by the cathode gasket, cathode and end plate 19. An oxidant inlet conduit 27 is sealingly associated with the end plate to allow oxidant to be fed to the oxidant chamber while an oxidant outlet conduit 28, which is optional, is similarly associated with the end plate to allow the purge of oxidant. It is recognized that where the fuel cell is to be operated on ambient air it is unnecessary that the fuel cell include any conduits or other means for delivering oxidant to the cathode. The anode, anode gasket and end plate 20 similarly cooperate to form a fuel chamber 29. A fuel outlet conduit 30 similar to oxidant outlet conduit 28 is provided. A fuel inlet conduit 31 is shown for providing a fuel to the fuel chamber from a fuel source (not shown).

In FIG. 2 of the drawing, there is shown generally an electrode cathode 11 embodying our invention which has a terminal grid in the form of a metal wire screen 32 which serves the functions of transmitting electrical current and providing reinforcement for the electrode. Electrode 11 has an electrode material 33 of high surface area particles selected from the class consisting of metallic disulfides and metallic phosphides held together by a binder material such as, for example, a fluorocarbon binder of polytetrafluoroethylene. Electrode material 33 surrounds both screen 32 and a portion of electrical lead 35. Other organic and inorganic binders may be employed in electrode 11 with the choice of such binder depending upon subsequent operating conditions such as temperature, electrolyte and pressure. The ratio of such a binder to the electrode material may be from about 5 to 50 percent by weight, with the preferred range being from about 10 to 30 percent by weight. A hydrophobic film 34 is bonded to one surface of material 33 to prevent electrolyte flow through electrode 10·

We found unexpectedly that we could form a unique inexpensive electrode which comprised particles selected from the class consisting of metallic disulfides and metallic phosphides bonded together by a binder. The metallic component of the disulfide or the phosphide is selected from the class consisting of molybdenum, tungsten, zirconium, niobium, hafnium and tantalum. Of these metals, we prefer molybdenum since it exhibits greater electrical conductivity. We found that such an electrode, when employed in an alkaline electrolyte fuel cell as its cathode, operated effectively and was resistant to electrolyte corrosion. We found further that we could form such improved electrodes when the above particles were coated with a non-noble metal such as silver.

While a terminal grid is incorporated into the electrode as shown in FIG. 2, the grid can also be pressed against the surface of the electrode. Such terminal grids which require material of good electrical conductivity can be provided in various configurations such as screens, metal wires, metal bars, punched metal plate, expanded metal plate, porous metal sheet, metal plaque, etc.

We found that it is preferred to employ a binder to hold the gas adsorbing particles together and to the current collector. The binder may be any adhesive material that is not chemically attacked by the electrolyte or the reactant fluid of the cell in which the electrode is to be used. Various binders meeting this criteria are known to the art. Preferred binders are hydrophobic halocarbons, most preferably fluorocarbon binders, having a critical surface tension less than the surface tension of water. A preferred critical surface tension is 32 dynes/cm. Critical surface tension is defined as the value of the liquid surface tension at which liquids spread on a given polymer surface. A full discussion of critical surface tension is provided at page 240, "Surface Chemistry Theory and Industrial Application" by Lloyd I. Osipow, Reinhold Publishing Corporation, New York, 1962. Perfluorinated polymers such as polytetrafluoroethylene (PTFE) and polyhexafluoropropylene possess the highest degree of hydrophobicity and chemical stability of presently known binders and are accordingly preferred.

As is well understood to those skilled in the art, if a hydrophobic binder is to be placed in an aqueous medium, it may be necessary to incorporate a small amount of wetting agent, such as a surfactant. "Teflon 30" is a trademarked name of a commercially available aqueous emulsion of polytetrafluoroethylene including a wetting agent and which is suitable for the practice of this method step. The ratio of such a binder to the total weight of the gas adsorbing particles excluding any current collector may be from about 10 to 30% by weight.

We found that such electrodes can be employed as cathodes in various electrochemical cells in which an alkaline electrolyte is used. With an alkaline electrolyte and our electrode as a cathode, other anodes can also be incorporated such as a standard platinum black electrode, which has 34 milligrams of platinum per square centimeter bonded with polytetrafluoroethylene as in the same manner of preparation as used for the electrodes of our invention.

Various alkaline electrolytes can be employed in an electrochemical cell which incorporates our improved electrode. Suitable alkaline electrolytes include potassium hydroxide, sodium hydroxide, etc.

In an illustrative formation of an electrode and the operation of an electrochemical cell in the form of a fuel cell employing such an electrode as the cathode as shown in FIGS. 1 and 2 of the drawing, molybdenum disulfide powder was sieved through a 400 mesh nylon polymer screen to give a surface area of 8.0 m.$^2$/g. A polytetrafluoroethylene suspension was added to the molybdenum disulfide powder. A paste, formed in this manner, was mixed thoroughly and then spread on a 1⅞ inch diameter platinum screen which was 45 x 45 mesh and had a wire diameter of 0.0078 inch so that the paste extended into and through the screen mesh openings. A platinum tab for electrical connection in the fuel cell extended from the screen. The electrode was dried slowly on a hot plate in air and then in a desiccator overnight. The electrode was weighed again to determine the total weight of the catalyst. The electrode was then waterproofed on one side by spraying with a hydrophobic film on one surface employing a Teflon suspension. Finally, the electrode was cured on a hot plate. If desired, the electrode can be pressed during formation. This method is described in an article entitled "A New High-Performance Fuel Cell Employing Conducting-Porous-Teflon Electrodes and Liquid Electrolytes" by L. W. Niedrach and H. R. Alford, which was published in the February 1965, issue of the Journal of the Electrochemical Society.

The above electrode was then employed as a cathode in a fuel cell while a standard platinum black electrode, which has 34 milligrams of platinum per square centimeter bonded with PTFE was employed as the anode. The cell was operated with oxygen gas to the cathode and hydrogen fuel to the anode. The hydrophobic film surface of the anode faced the fuel stream. Thirty percent potassium hydroxide was used as the electrolyte and the cell was operated at a temperature of 25° C. This cell operated quite satisfactorily.

Examples of electrodes and electrochemical cells employing such electrodes made in accordance with our invention are set forth below:

EXAMPLE 1

A fuel cell electrode was made in accordance with FIGS. 1 and 2 of the drawing which comprised mixing together 1.5 grams of molybdenum disulfide powder and 0.06 gram of PTFE to form a paste. The powder was obtained from a massive specimen which was ground and then sieved through a 400 mesh nylon polymer screen to give a surface area of only less than 1.0 m.$^2$/g. The paste was spread on a 17.8 square centimeter platinum screen which was 45 x 45 mesh, and had a wire diameter of 0.0078 inch so that the paste extended into and through the screen mesh openings. A platinum tab for subsequent electrical connection in the fuel cell extended from the screen. The electrode was dried for 2 hours after which it was cured on a hot plate in a temperature range of 260 C.–280 C. for 30 minutes including heating time. The electrode was cooled for 30 minutes while on the hot plate. The above electrode was then sprayed on one surface with a PTFE suspension diluted 7:1 using four sprayings of 1.1 cubic centimeters each over a 5 inch square area. The sprayed electrode was then heated in an oven for two minutes at 350° C. to provide the electrode with a hydrophobic film.

EXAMPLE 2

A fuel cell electrode was made in accordance with Example 1 except that the particles were 400 mesh size molybdenum phosphide. These particles had a surface area of less than 1.0 m.²/g. This electrode had a loading of 116 milligrams of molybdenum phosphide per square centimeter.

EXAMPLE 3

A fuel cell electrode was made in accordance with Example 1 employing molybdenum disulfide particles. However, these particles had a surface area of 8.0 m.²/g. This electrode had a loading of 74 milligrams per square centimeter.

EXAMPLE 4

A fuel cell electrode was made generally in accordance with Example 1 employing molybdenum disulfide particles. However, these particles had a surface area of 8.0 m.²/g. The particles were impregnated initially with a solution of silver acetate and the salt was decomposed by heating at 150° C. In this manner, the particles were coated with 10 weight percent silver. These coated particles were then formed into an electrode as described above in Example 1. This electrode had a loading of 50 milligrams per square centimeter.

EXAMPLE 5

A fuel cell electrode was made in accordance with Example 1 employing graphite particles for comparison with Examples 3 and 4. The graphite particles had a surface area of 12 m.²/g. This electrode had a loading of 40 milligrams per square centimeter.

EXAMPLE 6

Each of the above electrodes from Examples 1 and 2 was operated separately as a cathode in a fuel cell which had a standard platinum anode bonded with PTFE and having a loading of 34 milligrams of platinum per square centimeter of active area. The electrolyte in each of these fuel cells was 30 weight percent potassium hydroxide solution. Each of the cells was operated at a temperature of 25° C. Oxygen was supplied to the cathode while hydrogen gas was supplied to the anode.

The performance of these fuel cells, which are designated as cells 1 and 2, and include the cathodes from Examples 1 and 2, respectively, are set forth below in Table I. The activity of these cathodes was surprising in view of their low surface area and granular appearance. In this table, the cathode electrode versus the reference electrode is plotted in volts against current density in milliamperes per square centimeter.

TABLE I

| | Volts | |
|---|---|---|
| | Cell 1 | Cell 2 |
| Current density, ma./cm.²: | | |
| 5 | 0.71 | 0.68 |
| 10 | 0.66 | 0.58 |
| 20 | 0.62 | 0.47 |
| 30 | 0.58 | 0.41 |
| 40 | 0.53 | 0.38 |
| 45 | 0.49 | 0.37 |

EXAMPLE 7

Each of the above electrodes from Examples 3-5 was operated separately as a cathode in a fuel cell which had a standard platinum anode bonded with PTFE and having a loading of 34 milligrams of platinum per square centimeter of active area. The electrolyte in each of these fuel cells was 30 weight percent potassium hydroxide solution. Each of the cells was operated at a temperature of 25° C. Oxygen was supplied to the cathode while hydrogen gas was supplied to the anode.

The performance of these fuel cells, which are designated as cells 4, 5 and 6, and include the cathodes from Examples 3, 4 and 5, respectively, are set forth below in Table II. The activity of the cathodes in cells 3 and 4 is much greater than the activity of the cathodes in cells 1 and 2 since the surface area of cathodes from Examples 3 and 4 was 8.0 m.²/g. The graphite cathode in cell 5 had a surface area of 12 m.²/g. In Table II, the cathode electrode is plotted in volts against current density in milliamperes per square centimeter.

TABLE II

| | Volts | | |
|---|---|---|---|
| | Cell 3 | Cell 4 | Cell 5 |
| Current density, ma./cm.²: | | | |
| 20 | 0.80 | 0.88 | 0.73 |
| 40 | 0.78 | 0.86 | 0.70 |
| 100 | 0.75 | 0.84 | 0.67 |
| 200 | 0.70 | 0.80 | 0.64 |

While other modifications of the invention and variations thereof which may be employed within the scope of this invention have not been described, the invention is intended to include such as may be embraced within the following claims.

What we claim as new and desired to secure by Letters Patent of the United States is:

1. An electrode consisting essentially of particles selected from the class consisting of metallic disulfides and metallic phosphides, the metallic component of said disulfides and phosphides being selected from the class consisting of molybdenum, tungsten, zirconium, niobium, hafnium, and tantalum, a binder material holding the particles together in a coherent, unitary, gas permeable, electronically conductive mass, and an electrical lead in electrical contact with the bonded particles.

2. An electrode as in claim 1, in which the particles are molybdenum disulfiide.

3. An electrode as in claim 1, in which the particles are molybdenum phosphide.

4. An electrode as in claim 1, in which the particles are coated with silver.

5. An electrochemical cell comprising an anode, means for supplying a fuel to the anode, a cathode spaced from the anode, the cathode consisting essentially of particles selected from the class consisting of metallic disulfides and metallic phosphides, the metallic component of said disulfides and phosphides being selected from the class consisting of molybdenum, tungsten, zirconium, niobium, hafnium, and tantalum, a binder material holding the particles together in a coherent, unitary, gas permeable, electronically conductive mass, and an electrical lead in electrical contact with the bonded particles, means for supplying an oxygen oxidant to the cathode, and an alkaline electrolyte in contact with both the anode and the cathode.

References Cited

UNITED STATES PATENTS 2,921,110  1/1960  Crowley et al. _____ 136—86
3,449,169  6/1969  Rhodes _____ 136—86

WINSTON A. DOUGLAS, Primary Examiner

A. SKAPARS, Assistant Examiner

U.S. Cl. X.R.

23—204, 206; 136—120; 252—437, 439